(12) United States Patent
Khurana

(10) Patent No.: US 10,007,398 B2
(45) Date of Patent: Jun. 26, 2018

(54) INTEGRATED SUPPLIER INFORMATION TOOL

(71) Applicant: BANK OF AMERICA CORPORATION, Charlotte, NC (US)

(72) Inventor: Rajan Khurana, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 466 days.

(21) Appl. No.: 14/588,420

(22) Filed: Jan. 1, 2015

(65) Prior Publication Data

US 2016/0196317 A1    Jul. 7, 2016

(51) Int. Cl.
*G06F 3/0482* (2013.01)

(52) U.S. Cl.
CPC .................. *G06F 3/0482* (2013.01)

(58) Field of Classification Search
CPC ..................................... G06F 3/0482
See application file for complete search history.

(56) References Cited

U.S. PATENT DOCUMENTS

| | | | | |
|---|---|---|---|---|
| 2003/0040823 A1* | 2/2003 | Harm | | G06Q 10/06 700/97 |
| 2004/0024784 A1* | 2/2004 | Spall | | G06Q 30/02 |
| 2009/0281847 A1* | 11/2009 | Hamilton, II | | G06F 17/303 705/7.36 |
| 2011/0040665 A1* | 2/2011 | Long | | G06Q 40/00 705/35 |
| 2011/0252463 A1* | 10/2011 | Yeleshwarapu | | G06F 17/30867 726/7 |
| 2012/0151380 A1* | 6/2012 | Bishop | | G06Q 10/107 715/752 |
| 2013/0297424 A1* | 11/2013 | Baca | | G06Q 30/0611 705/14.58 |
| 2014/0365348 A1* | 12/2014 | Ballaro | | G06Q 30/0601 705/30 |
| 2015/0012294 A1* | 1/2015 | Casady | | G06Q 30/014 705/2 |
| 2016/0188685 A1* | 6/2016 | Janarthanam | | G06F 17/30867 707/602 |

\* cited by examiner

*Primary Examiner* — Ashish K Thomas
*Assistant Examiner* — Dustin Eyers
(74) *Attorney, Agent, or Firm* — Michael A. Springs; Moore & Van Allen PLLC; Peter B. Stewart

(57) ABSTRACT

Embodiments of the invention are directed to systems, methods and computer program for providing an integrated supplier information tool. An exemplary apparatus is configured to provide a user interface associated with an integrated supplier information tool, whereby the integrated supplier information tool is associated with a contract database and an electronic invoicing database, and wherein the user interface enables a user to select one or more options for presenting information associated with the contract database and the electronic invoicing database; integrate data from the contract database and the electronic invoicing database; receive an indication to select at least one option within the supplier information tool; and in response to receiving the indication to select the at least one option, present on the user interface data related to at least one of the contract database or the electronic invoicing database.

18 Claims, 10 Drawing Sheets

I-SIT - CONTRACT DATA

INTEGRATED SUPPLIER INFORMATION TOOL (I-SIT)

| SUPPLIER - ERP SUPPLIER (PARENT) | SUPPLIER - ERP SUPPLIER (CHILD) | SUPPLIER - DUNS (UPSTREAM) | DATA SOURCE | MATCH TYPE | ACW CONTRACT ID | CONTRACT STATUS | AMENDMENT TYPE |
|---|---|---|---|---|---|---|---|
| PARENT A | PARENT A CREDIT SERVICES | 00000001 | UPSTREAM | NEAREST MATCH | C1 | PUBLISHED | ADMINISTRATIVE |
| PARENT A | PARENT A CREDIT SERVICES | 00000001 | UPSTREAM | NEAREST MATCH | C2 | PUBLISHED | UNCLASSIFIED |
| PARENT A | PARENT A CREDIT SERVICES | 00000001 | UPSTREAM | NEAREST MATCH | C3 | PUBLISHED | UNCLASSIFIED |
| PARENT A | PARENT A CREDIT SERVICES | 00000001 | UPSTREAM | NEAREST MATCH | C4 | PUBLISHED | ADMINISTRATIVE |
| PARENT A | PARENT A CREDIT SERVICES | 00000001 | UPSTREAM | NEAREST MATCH | C5 | PUBLISHED | ADMINISTRATIVE |
| PARENT A | PARENT A CREDIT SERVICES | 00000001 | UPSTREAM | NEAREST MATCH | C6 | PUBLISHED | ADMINISTRATIVE |
| PARENT A | PARENT A CREDIT SERVICES | 00000001 | UPSTREAM | NEAREST MATCH | C7 | PUBLISHED | ADMINISTRATIVE |
| PARENT A | PARENT A PLC | 00000002 | UPSTREAM | EXACT MATCH | C8 | PUBLISHED | UNCLASSIFIED |
| PARENT A | PARENT A PLC | 00000002 | UPSTREAM | EXACT MATCH | C9 | PUBLISHED | ADMINISTRATIVE |
| PARENT A | PARENT A PLC | 00000002 | UPSTREAM | EXACT MATCH | C10 | PUBLISHED | ADMINISTRATIVE |
| PARENT A | PARENT A PLC | 00000002 | UPSTREAM | EXACT MATCH | C11 | PUBLISHED | ADMINISTRATIVE |
| PARENT A | PARENT A PLC | 00000002 | UPSTREAM | EXACT MATCH | C12 | PUBLISHED | AMENDMENT |
| PARENT A | PARENT A PLC | 00000002 | UPSTREAM | EXACT MATCH | C13 | PUBLISHED | AMENDMENT |
| PARENT A | PARENT A PLC | 00000002 | UPSTREAM | EXACT MATCH | C14 | PUBLISHED | UNCLASSIFIED |
| PARENT A | PARENT A PLC | 00000002 | UPSTREAM | EXACT MATCH | C15 | PUBLISHED | ADMINISTRATIVE |
| PARENT A | PARENT A PLC | 00000002 | UPSTREAM | EXACT MATCH | C16 | PUBLISHED | AMENDMENT |
| PARENT A | PARENT A PLC | 00000002 | UPSTREAM | EXACT MATCH | C17 | PUBLISHED | AMENDMENT |

CONTRACT DATA | BACK TO SUPPLIER SEARCH

*FIG. 6*

I-SIT GLOSSARY

| KEY WORDS | DESCRIPTION |
|---|---|
| CW | CONTRACT WORKSPACE |
| CC | CONTRACT COMPLIANCE |
| CONTRACT DATA | DATA FROM CONTRACT ENVIRONMENT |
| E-INVOICING DATA | DATA FROM E-INVOICING ENVIRONMENT |
| PARENT SUPPLIER NAME | SUPPLIER WHICH HAS MULTIPLE ENTITIES ENABLED WITH CHILD NAME. |
| CHILD SUPPLIER NAME | EXACT NAME UNDER WHICH THE SUPPLIER HAS BEEN ENABLED WITH US UNDER UPSTREAM/DOWNSTREAM ENVIRONMENT. |

BACK TO HOME

FIG. 9

INTEGRATED SUPPLIER INFORMATION TOOL

BACKGROUND

Traditionally, database servers and systems that are independent of one another may utilize different formats and identifiers. As a result, there may be mismatched names and data points for the same parameter. This may result in the task of data comparison, amongst two systems, being fairly tedious. Therefore, a need exist for a means to automatically extract data from independent systems, cleanse the data, and provide analytical reports and comparisons of the cleansed data.

BRIEF SUMMARY

Embodiments of the invention are directed to systems, methods, and computer program products for integrating supplier information and presenting the integrated supplier information to a user. An exemplary apparatus may comprise an electronic storage device; a computing processor; and a module stored in the electronic storage device, said module comprising instruction code executable by one or more computing processors, and configured to cause the one or more computing processors to provide a user interface associated with an integrated supplier information tool, whereby the integrated supplier information tool is associated with a contract database and an electronic invoicing database, and wherein the user interface enables a user to select one or more options for presenting information associated with the contract database and the electronic invoicing database; integrate data from the contract database and the electronic invoicing database, wherein the integrating the data comprises creating a contract database dataset and an electronic invoicing database dataset; receive an indication to select at least one option within the supplier information tool; and in response to receiving the indication to select the at least one option, present on the user interface data related to at least one of the contract database or the electronic invoicing database.

In some embodiments, integrating data from the contract database and the electronic invoicing database comprises the module being further configured to cause one or more computing processors to extract data from a contract database and an electronic invoicing database, wherein the contract database and the electronic invoicing database are independent of one another such that there is no point of comparison between the contract database and the electronic database.

In some embodiments, integrating data from the contract database and the electronic invoicing database comprises the module being further configured to cause one or more computing processors to cleanse the data from the contract database and the electronic invoicing database such that at least one point of comparison exist between the contract database and the electronic invoicing database In some embodiments, cleansing the data from the contract database and the electronic invoicing database comprises the module being further configured to cause one or more computing processors to delete at least one parameter within the data from the contract database and the electronic invoicing database.

In some embodiment, the contract database dataset and the electronic database dataset comprise a plurality of line items, and cleansing the data from the contract database and the electronic invoicing database comprises the module being further configured to cause one or more computing processors to create the at least one point of comparison; and associate the at least one point of comparison with the plurality of lines items within the contract database dataset and the electronic database dataset.

In some embodiments, the at least one point of comparison is defined by a parent supplier name, the parent supplier name is associated with a unique identification number, and associating the at least one point of comparison with the plurality of line items comprises the module being further configured to cause one or more computing processor to for each individual line item, determine whether or not a first text string corresponding to the parent supplier name matches a text string corresponding to a supplier name parameter of the contract database dataset and the electronic database dataset; and for each individual line item, determine whether or not a second text string corresponding to the unique identification number matches a text string corresponding to a unique identification number parameter of the contract database dataset and the electronic database dataset.

In some embodiments, associating the at least one point of comparison with the plurality of line items comprises the module being further configured to cause one or more computing processor to iteratively match each individual line item with the at least one point of comparison until each individual line item of the contract database dataset and the electronic database dataset until every field associated with the point of comparison is not null.

In some embodiments, associating the at least one point of comparison with the plurality of line items comprises the module being further configured to cause one or more computing processor to determine a match type for each individual line item, where the system may determine that an individual line item is an exact match in response to determining that the first text string corresponding to the parent supplier name matches the text string corresponding to a supplier name parameter of the contract database dataset and the electronic database dataset and the second text string corresponding to the unique identification number matches the text string corresponding to the unique identification number parameter of the contract database dataset and the electronic database dataset, and where the system may determine that an individual line item is nearest match in response to determining that the first text string corresponding to the parent supplier name matches the text string corresponding to a supplier name parameter of the contract database dataset and the electronic database dataset and the second text string corresponding to the unique identification number does not match the text string corresponding to the unique identification number parameter of the contract database dataset and the electronic database dataset.

In some embodiments, determining a match type for each individual line item further comprises the module being further configured to cause one or more computing processors to color code an individual line item based on the determined match type, wherein the individual line item is designated with a first color in response to determining the individual line item is an exact match, and wherein the individual line item is designated with a first color in response to determining the individual line item is a nearest.

In some embodiments, integrating data from the contract database and the electronic invoicing database comprises the module being further configured to cause one or more computing processors to analyze the data, and generate one or more reports associated with the contract database and the electronic invoicing database.

In some embodiments, the contract database comprises data related to a plurality of contracts associated with one or more suppliers, and the module is further configured to cause one or more computing processors to provide a survey for receiving rating related to the one or more suppliers.

In some embodiments, the module is further configured to cause one or more computing processors to determine a safety profile for each individual supplier based on the ratings related to the one or more suppliers, and wherein the safety profile indicates a level of safety for conducting business with the one or more suppliers.

In some embodiments, the contract database dataset and the electronic database dataset comprise a plurality of line items, and wherein the safety profile is associated with each individual line item, and wherein determining the safety profile for each individual supplier comprises the module being further configured to cause one or more computing processors to color code an individual line item associated with each individual supplier based on the ratings related to the one or more suppliers.

In some embodiments, the at least one option comprises an option to provide feedback related to integrated supplier information tool such that in response to receiving an indication to select the at least one option, the module is further configured to cause one or more computing processors to present a feedback interface within the integrated supplier information tool.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
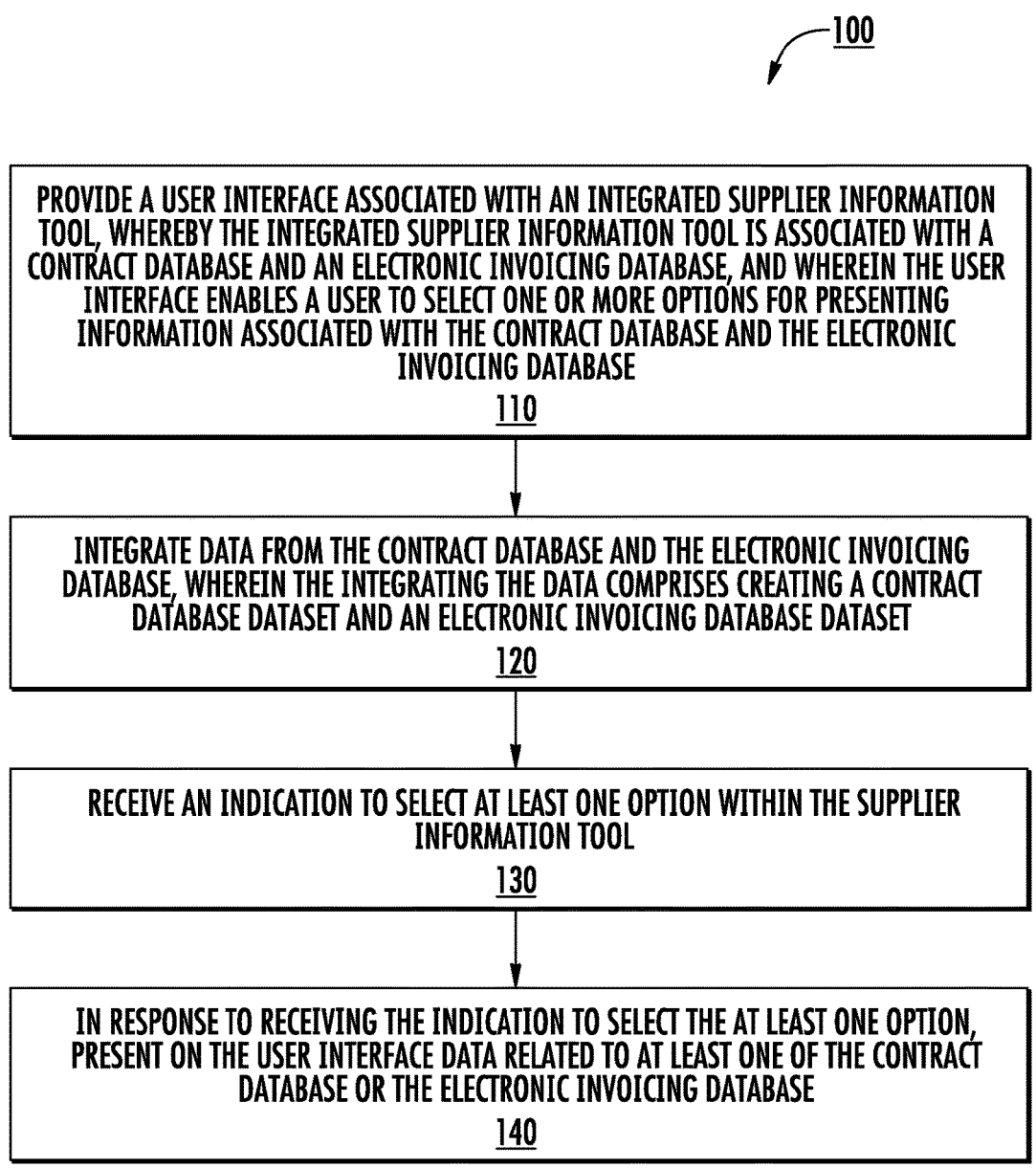
Figure 2:
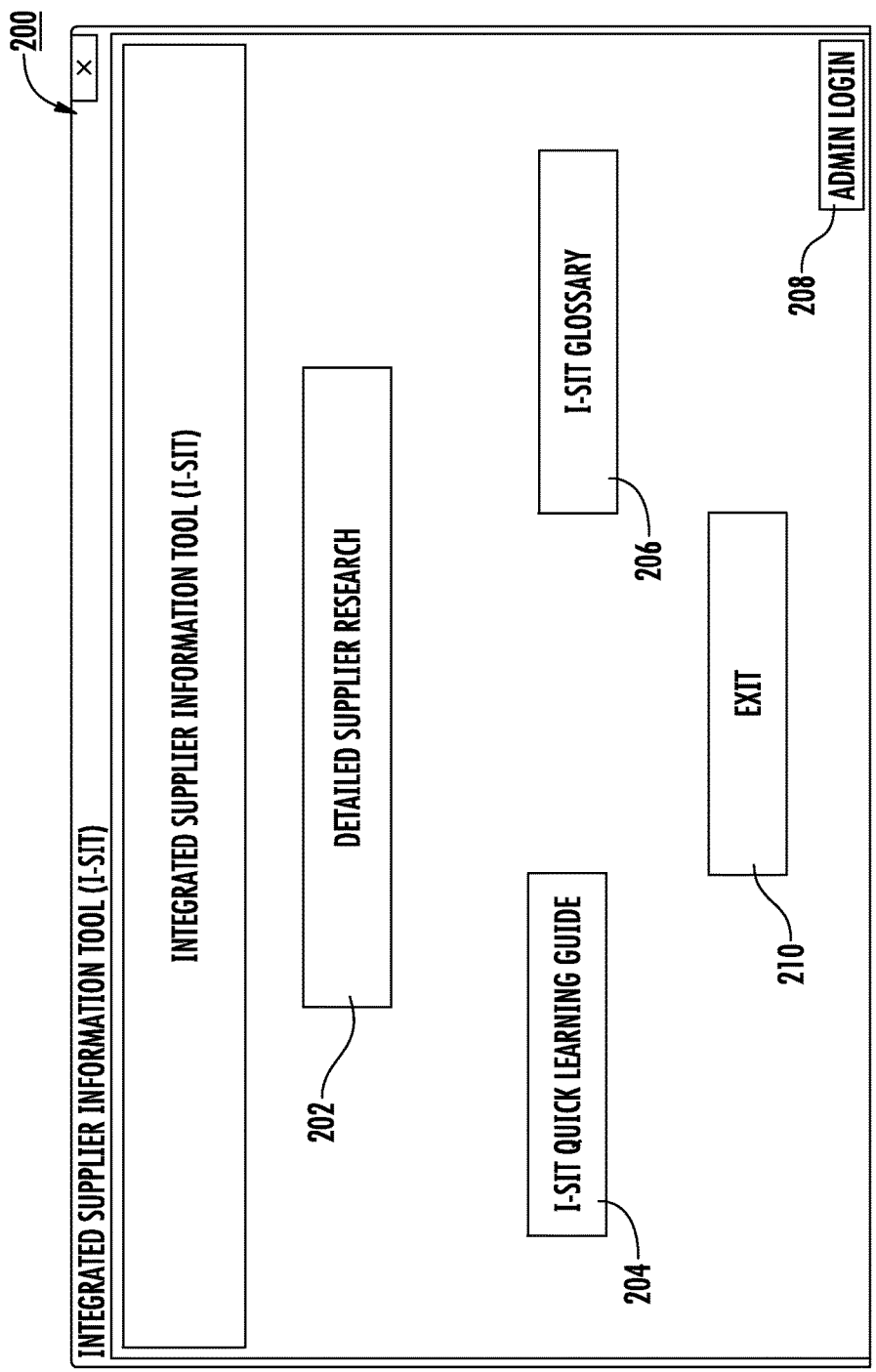
Figure 3:
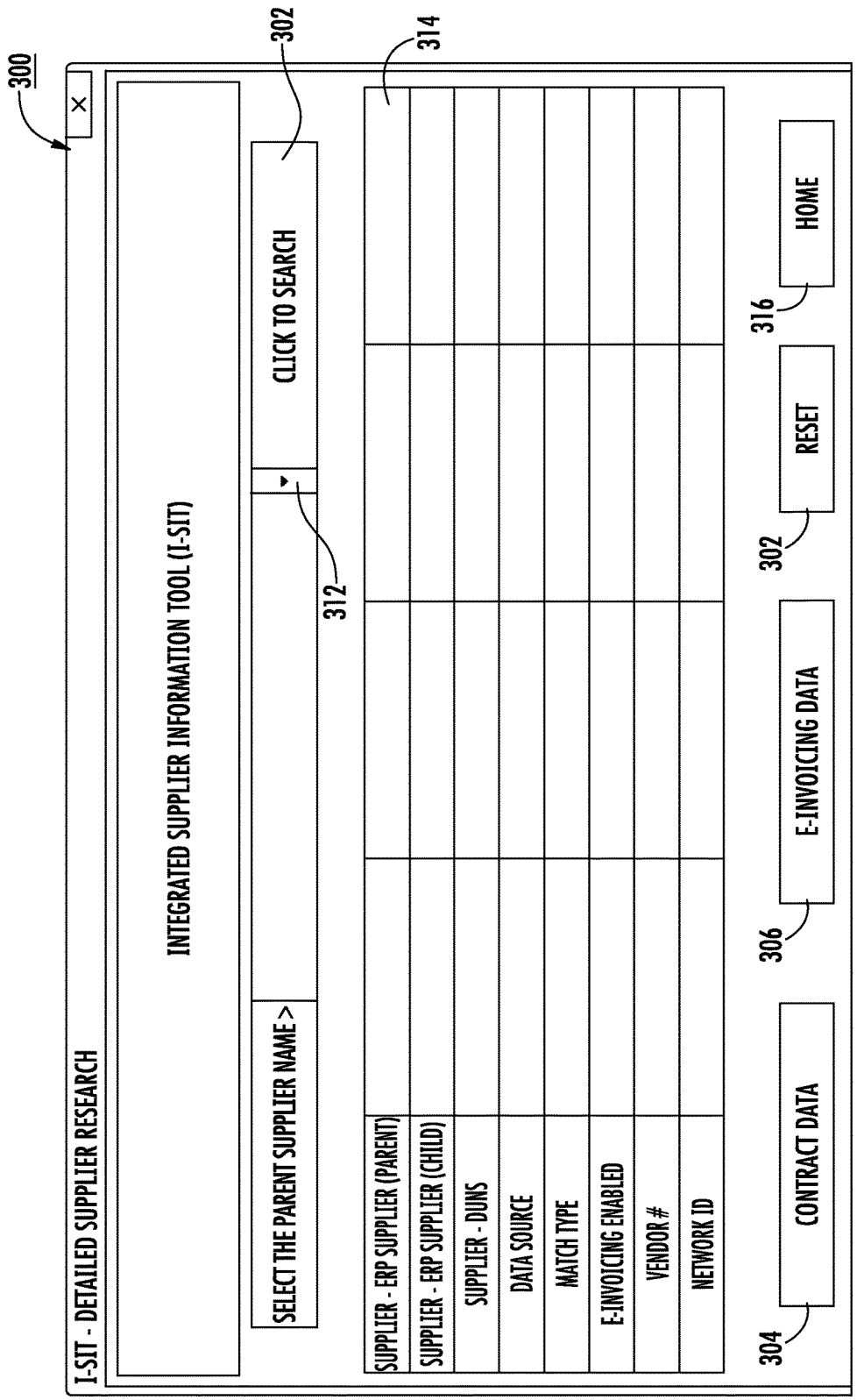
Figure 4:
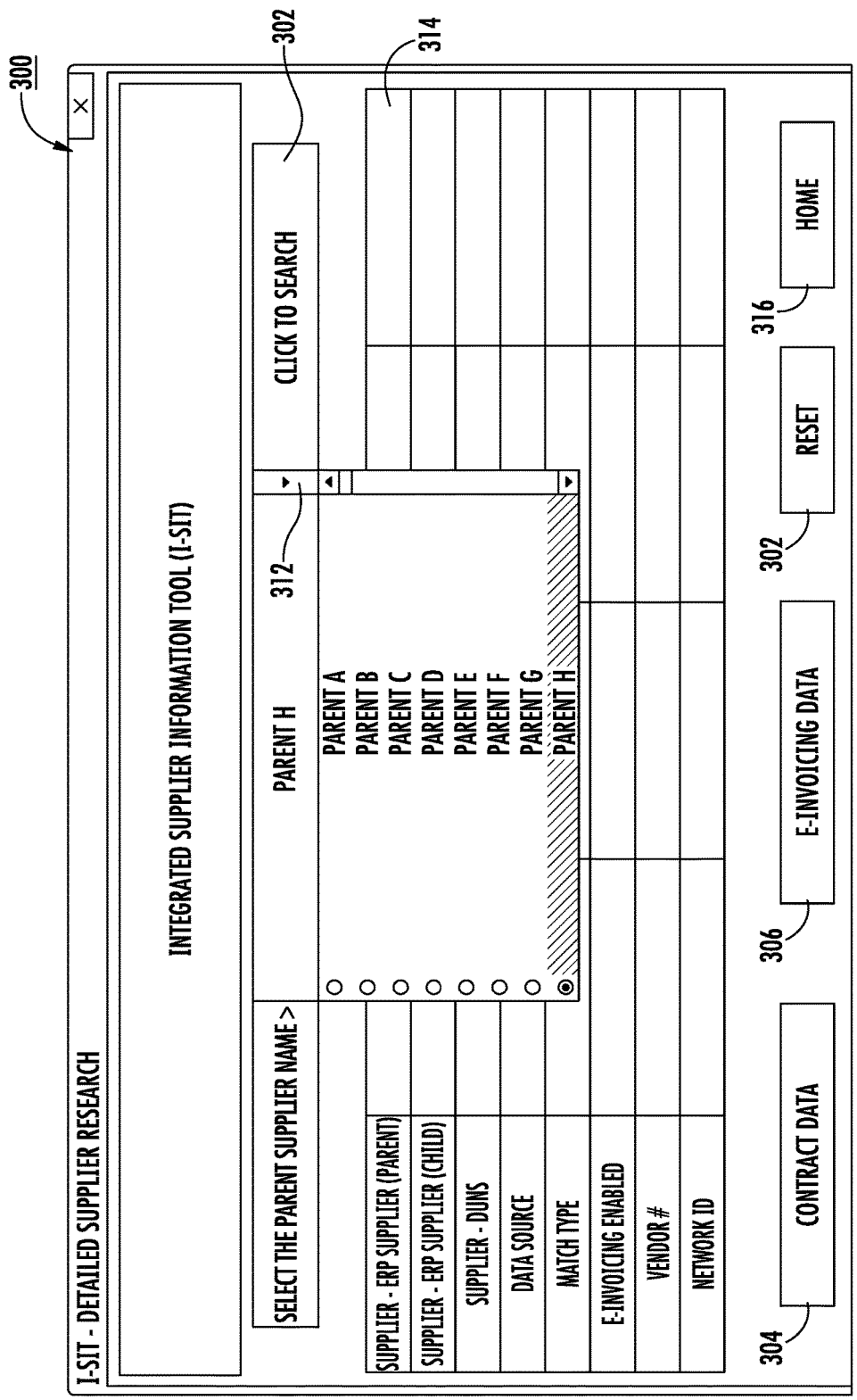
Figure 5:
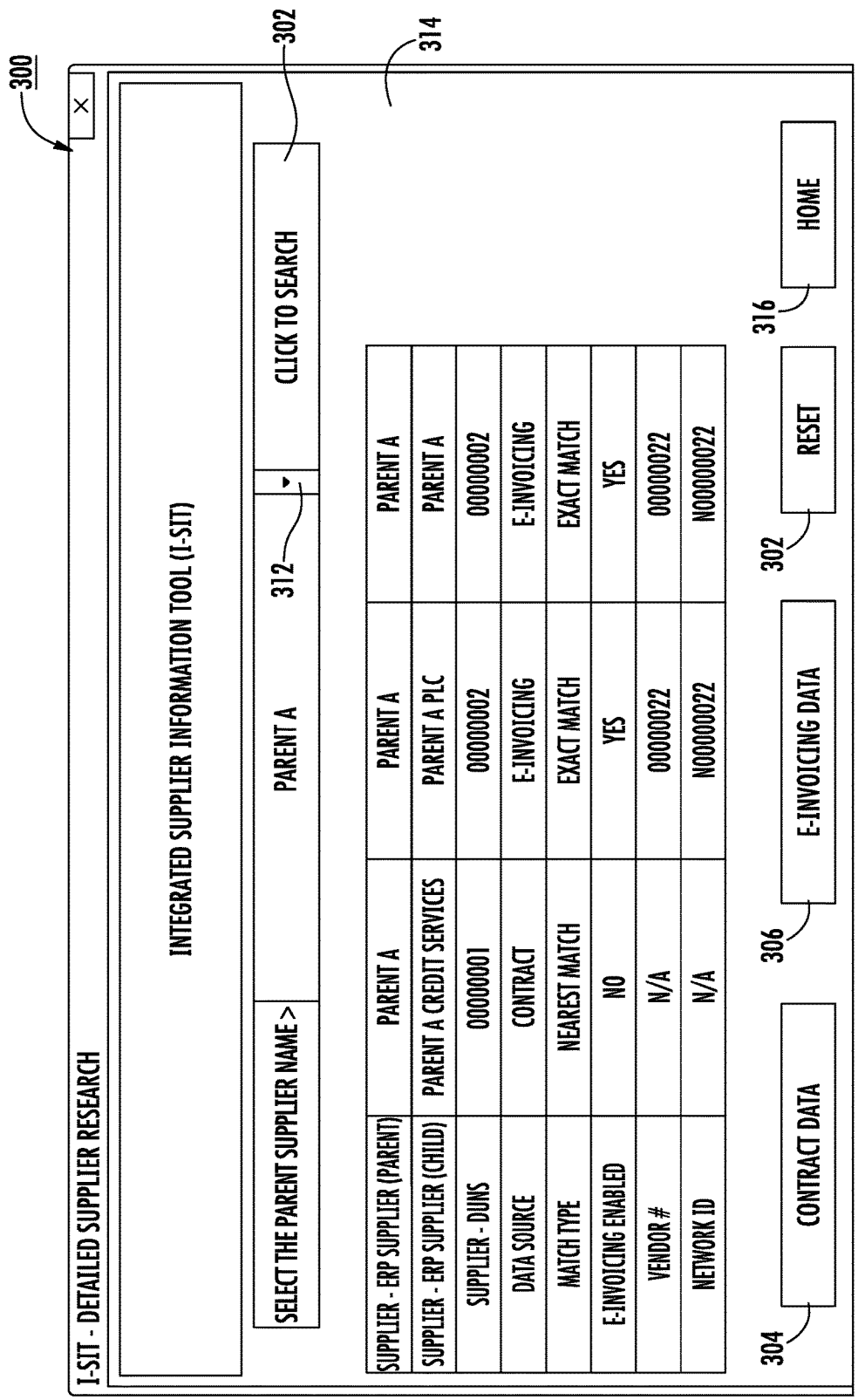
Figure 7:
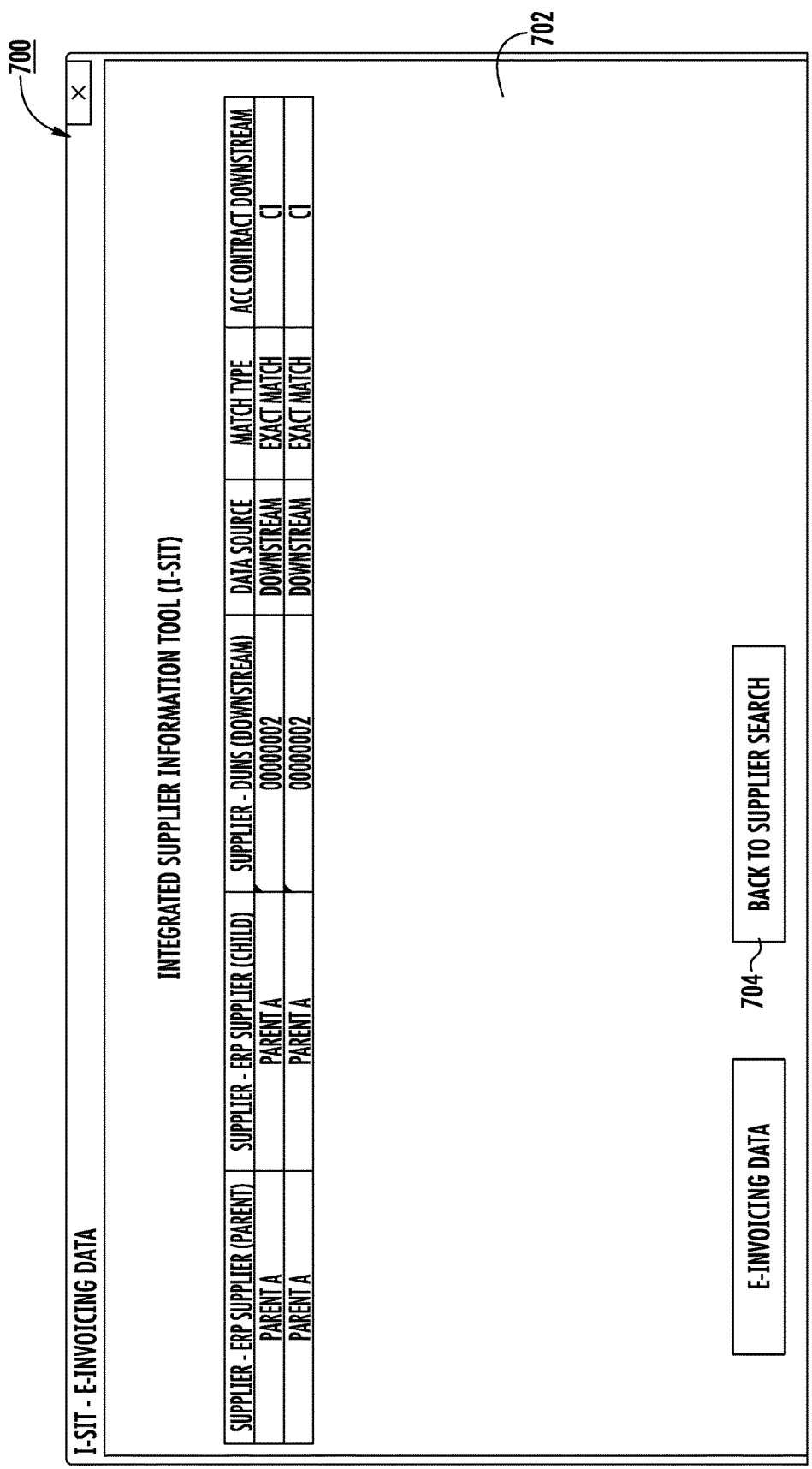
Figure 8:
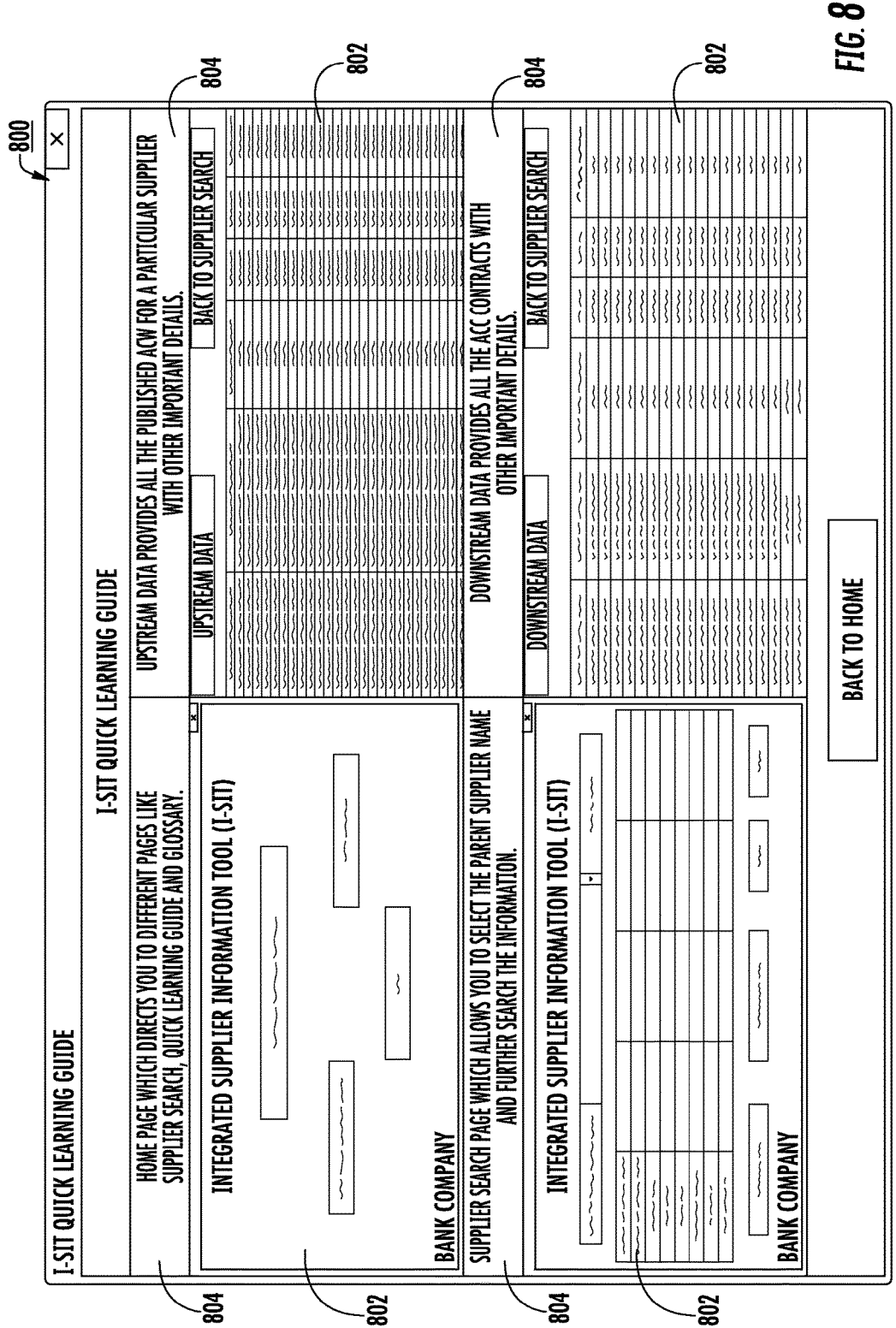
Figure 10:
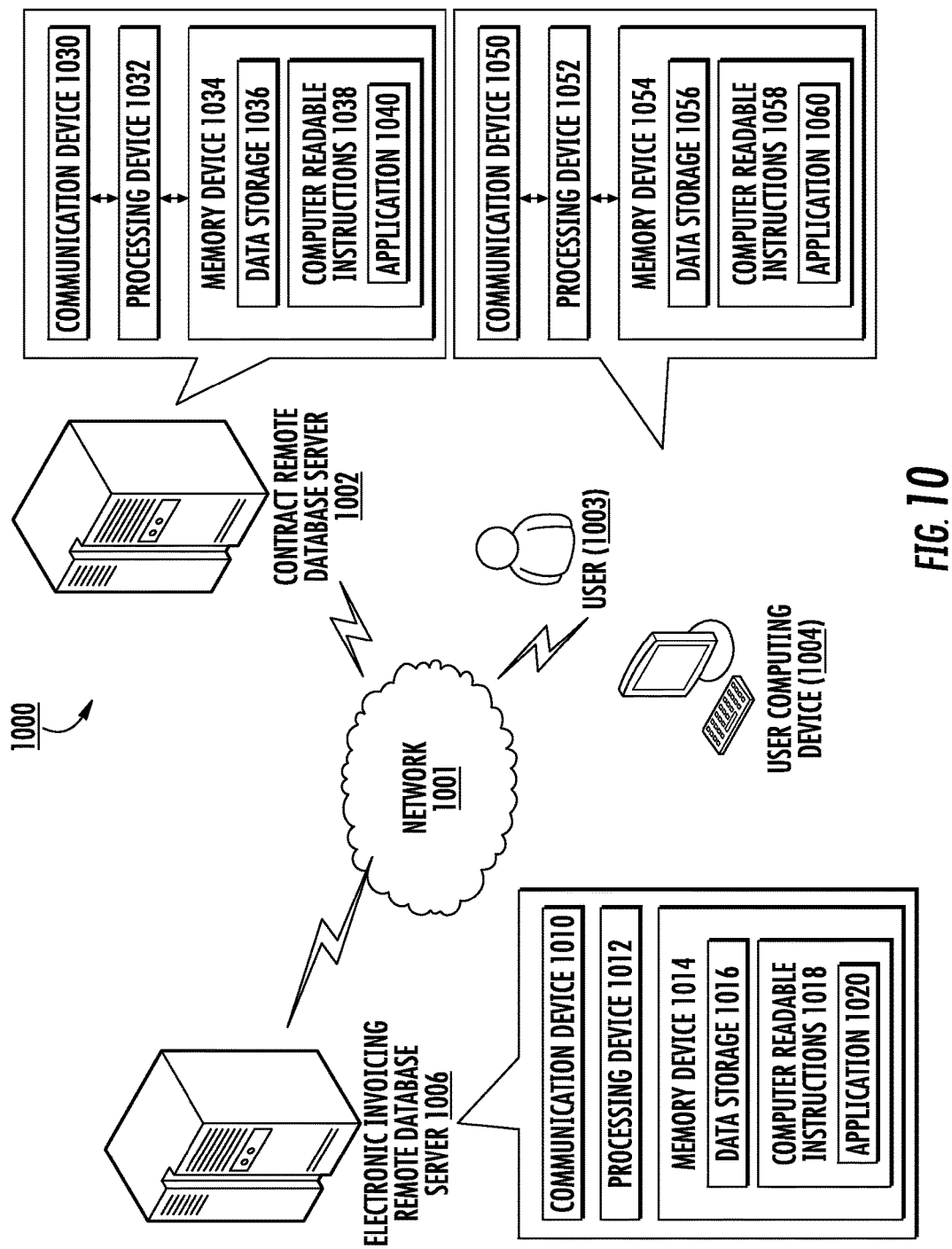

Having thus described embodiments of the invention in general terms, reference will now be made to the accompanying drawings, where:

FIG. 1 is a high level process flow for an integrated supplier information tool, in accordance with embodiments of the present invention;

FIG. 2 is a screenshot illustrating an integrated supplier information tool, in accordance with embodiments of the present invention;

FIG. 3 is a screenshot illustrating an integrated supplier information tool, in accordance with embodiments of the present invention;

FIG. 4 is a screenshot illustrating an integrated supplier information tool, in accordance with embodiments of the present invention;

FIG. 5 is a screenshot illustrating an integrated supplier information tool, in accordance with embodiments of the present invention;

FIG. 6 is a screenshot illustrating an integrated supplier information tool, in accordance with embodiments of the present invention;

FIG. 7 is a screenshot illustrating an integrated supplier information tool, in accordance with embodiments of the present invention;

FIG. 8 is a screenshot illustrating an integrated supplier information tool, in accordance with embodiments of the present invention;

FIG. 9 is a screenshot illustrating an integrated supplier information tool, in accordance with embodiments of the present invention; and FIG. 10 is a diagram illustrating a networking environment system, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for use providing an integrated supplier information tool such that information related to various databases or individual applications may be integrated and presented within the central location. The invention enables a system to provide a user interface associated with various databases and configured to receive user input, integrate the data from the various databases and present the integrated data within the integrated supplier information tool.

In some embodiments, an "entity" may refer to a business entity that is either maintaining or acting on behalf of an entity maintaining one or more databases for monitoring and data housing. For example, in exemplary embodiments, an entity may be a financial institution, or one or more parties within the financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a customer to establish an account with the entity. An "account" may be the relationship that the customer has with the entity. Examples of accounts include a deposit account, such as a transactional account (e.g., a banking account), a savings account, an investment account, a money market account, a time deposit, a demand deposit, a pre-paid account, a credit account, a non-monetary customer profile that includes only personal information associated with the customer, or the like. The account is associated with and/or maintained by the entity. In other embodiments, an entity may not be a financial institution. In still other embodiments, the entity may be the merchant itself.

In some embodiments, the "customer" or "client" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded).

Method for Providing an Integrated Supplier Information Tool

Referring now to FIG. 1, a high level process flow for providing an integrated supplier information tool 100 is illustrated in accordance with one embodiment of the present invention, which will be discussed in further detail throughout this specification. As illustrated, the method may comprise a plurality of steps, including but not limited to, providing a user interface associated with an integrated supplier information tool, whereby the user interface enables a user to select one or more options within the supplier information tool, and wherein the integrated supplier information tool is associated with a contract database and an electronic invoicing database 110, integrating data from the contract database and the electronic invoicing database 120, receiving an indication to select at least one option within the supplier information tool 130, and in response to receiving the indication to select the at least one option, presenting on the user interface data related to at least one of the contract database or the electronic invoicing database 140.

At step 110, the system may provide a user interface associated with an integrated supplier information tool. The user interface enables a user to select one or more options within the supplier information tool for. In an exemplary embodiment, the integrated supplier information tool is associated with a contract database and an electronic invoicing database.

As illustrated in FIG. 2, the integrated supplier information tool may comprise a home page that is initially presented to a user and comprises a plurality of options for presenting at least one secondary page within the supplier information tool. The options may include, but not be limited to, an option for providing detailed supplier research 202, an option for presenting a quick learning guide associated with the integrated supplier information tool 204, an option for presenting a glossary associated with the integrated supplier information tool 206, an option to access integrated supplier information tool as an administrator 208, and an option for exiting the integrated supplier information tool 210.

At step 120, the system may integrate data from the contract database and the electronic invoicing database. In one embodiment, integrating data from the contract database and the electronic invoicing database first comprises extracting data from a contract database and the electronic invoicing database. In an exemplary embodiment, the contract database and the electronic invoicing database are independent of one another such that there is no point of comparison between the contract database and the electronic database. In some embodiments, although the databases are independent of one another, the contract database and the electronic invoicing database may be associated with a single platform that is configured to be integrated with multiple applications such that the contract database and the electronic invoicing database may contain data from the various applications integrated within the platform. For example, the contract database may be associated with a contact application integrated within the platform, where the contract application maintains legal contracts related to various vendors and suppliers associated a particular business entity. Likewise, the electronic invoicing database may be associated with an electronic invoicing application integrated within the platform, where the electronic invoicing application provides invoicing related to various vendors and suppliers associated a particular business entity.

In one embodiment, extracting the data may comprise the system being configured to submit one or more queries for receiving data based on a plurality of specified parameters. In this way the extracted data may be related to specific time periods, parameters within the data, and the like. The extracted data may be defined by at least one table that contains various parameters (e.g. supplier name, a unique numeric identifier from the data universal numbering system ("DUNS Number"), and the like). A single line item or row may then be provided for each individual contract within a given database.

In one embodiment, extracting the data may further comprises being granted access to the databases which may require having access to a server driver or applet that is configured to provide communication with databases and/or servers from a user access location such as a desktop or laptop computer. Thus in some embodiments, the system may provide a server driver for download or temporary launch on a user device for the purpose of establishing communication with a database server. As used herein the server driver may refer to any application that is configured for communication with a database server. As such the server driver may provide a user interface that allows the user to implement one or more commands to be processed on the corresponding server for the purpose of instruction implementations, data querying, and the like. The server driver may be implemented within an integrated supplier information tool. In some embodiments, the integrated supplier information tool may be protected such that access to a database via the integrated supplier information tool may first require authenticating the user's identity or requesting user login credentials. The system may prompt the user to provide one or more authentication credentials such as a user identification number and corresponding password. After verifying the validity of the authentication credentials provided by the user, access may be granted to the integrated supplier information tool.

In an exemplary embodiment, the authentication is based at least partially on user input or general information that verifies that user is authorized to access the integrated supplier information tool and the data stored therein. The user input or general information may be received from a user access device via a user interface of the supplier information tool. The user input or general information may typically comprise one or more authentication credentials associated with the user. The requested and/or received authentication credentials may vary based on the level of access being granted, or the type of actions that the user may complete (or is expected to complete) throughout the session. In this way, numerous types and levels of user authentication may exist (e.g. general authentication, administrative authentication), and the user may be initially authenticated for a primary level of access to conduct general actions within the database (e.g. view or query data), and the user may be required to provide a subsequent stricter authentication in an instance where a need exist to conduct an action that is not provided within the primary level of access received (e.g. modify algorithms utilized by the tool). For example, the primary level of access may include the user being able to query data and review reports generated by providing a user login name. In an event that the user decides to alter an algorithm associated with the tool, the user may be required to provide additional authentication credentials, such as an administrative login and password, prior to being granted access to perform additional actions within the tool. The user authentication credentials that may include, but not be limited to, a username, user identification number, password, account number, full-length social security number or partial digits, challenge questions, familiar pictures and/or phrases, biometrics, key fob-based alphanumeric codes, and the like. In some embodiments, the user authentication credentials are explicitly provided by the user, and in other embodiments the user authentication credentials are stored within the user's device and automatically transferred, in response to a request, to access the databases on the user's behalf.

In one embodiment, after extracting data from the contract database and the electronic invoicing database, integrating data from the contract database and the electronic invoicing database further comprises cleansing the data from the contract database and the electronic invoicing database such that at least one point of comparison exist between the contract database and the electronic invoicing database. In one embodiment, cleansing the data further comprises creating a point of comparison between the contract database and the electronic invoicing database. For example, the point of comparison may be defined by a parent supplier name, where the parent supplier name is embodied as a parameter and/or column within the dataset, and the point of comparison may be further associated with a numeric identifier such as a DUNS number.

In one embodiment, the data is extracted from one or more websites such that cleansing the data further requires deleting parameters within the data that are not needed by the system. For example, the data may be cleansed such that only published contracts are provided within the dataset. In such an embodiment, the system may be configured to delete closed or dropped contracts from the extracted data such that only the published contracts remain within the dataset. In another example, the data may be cleansed such that legacy contracts are excluded from the extracted dataset, where the legacy contract may refer to contracts that have been published for informational purposes and are not required for electronic invoicing. However, it should be noted that, the algorithm for generating the cleansed dataset may be modified such that any contract type may be included and/or excluded from the cleansed dataset.

In one embodiment, the created point of comparison (e.g. the parent supplier name) may then be associated with each individual line item in the datasets extracted from the contract and electronic invoicing database. The point of comparison may be associated with the line item by matching the point of comparison with another parameter within the extracted datasets. The system may utilize text string parameters such as the parent supplier name or DUNS number to locate supplier matches within the data extracted from the individual databases. A single supplier may parent supplier may comprise multiple DUNS numbers. For example, Data from the contract database may then be compared to data from the electronic invoicing database using the parent supplier name as a point of comparison. In one embodiment, the system may create a parent supplier name list such that each line item within the extracted datasets is associated with at least one parent supplier name specified in the parent supplier name list. In an exemplary embodiment, the system may be configured to iteratively match each line item (corresponding to different parent supplier names) of the parent supplier name list to a line items of the extracted datasets until each individual line item of the extracted dataset has been matched with a parent supplier name specified in the parent supplier name list.

In one embodiment, cleansing the data comprises modifying the extracted dataset to include the point of comparison and the level of accuracy regarding the match between the points of comparison (e.g. parent supplier names) and the individual line item. In such an embodiment, the system may be configured to determine a match type, where the match may be either an exact match or a nearest match. In one embodiment, the system determines that the line item is an exact match for the point of comparison in response to determining that a predefined number or matches exist between the point of comparison and the parameters of the line. Likewise, the system may determine that the line item is a nearest match for the point of comparison in response to determining that at least one parameter associated with the point of comparison does not match the corresponding parameter of the line item.

For example, the system may first create "Parent A" as a parent supplier name. The system may then determine matches for the supplier name "Parent A" and the DUNS number associated with "Parent A". The "Parent A" company may have a subsidiary supplier name of "Parent A Corporation" within one or more line items of the dataset. In such an embodiment, the subsidiary supplier name may be listed, within the database, as a child supplier name that is associated with the parent supplier name. If the system determines, within any given line item, that matches exist for a first text string of "Parent", a second text string of "A", and a third text string related to the corresponding DUNS number, the system may subsequently determine that the line item is an exact match. For example, "Parent A Corporation" may be specified as an exact match of "Parent A" if the DUNS number of "Parent A Corporation" matches the DUNS number associated with "Parent A". Alternatively, if the system determines, within any given line item, that matches exist for a first text string of "Parent" and a second text string of "A", and do not exist for a third text string related to the corresponding DUNS number, the system may subsequently determine that the line item is a nearest match. For example, "Parent A Corporation" may be specified as nearest match of "Parent A" if the DUNS number of "Parent A Corporation" does not match the DUNS number associated with "Parent A".

In some embodiments, determining the match type between a parent supplier name and a line item within either the extracted contract dataset or the extracted electronic invoicing dataset further comprising color coding the line item based on the determined match type. For example, line items that are determined to be an exact match may be color coded with a first color, and line items that are determined to be a nearest match may be color coded with a second color. By doing so, the system and/or an individual who is doing a visual analysis of the data may automatically determine the match type of a corresponding line item based on the color of the line item. Additionally, when cleansing the data supplemental parameters may be included in the dataset for future analysis. For example, the line items may include a data source parameter indicating whether or not the data was extracted from the contract application or the electronic invoicing application.

In some embodiments, the system may be configured to analyzed the integrated data and generate one or more reports related to the integrated data. In one embodiment, the system may be configured to receive user comments as it related to individual contracts within either the contract database or the electronic invoicing database such that the user may provide a rating of the contract and the system may analyze the integrated datasets to determine the efficiency of a particular contract or supplier. For example, a line of business with a business entity that utilizes a contract may provide comments and/or a rating indicating the efficiency of a particular supplier. The rating may indicate whether or not the supplier provides services and goods on time, and the like. The ratings may be embodied by percentages, rankings, alphabetic grades, tiers, and the like. For example, if a supplier provides services on time they may be assigned a one hundred percent (100%) rating, a ten out of ten ranking (10 out of 10), and/or a high level tier. If a supplier mostly provides services on time they may be assigned a seventy percent (70%) rating, a seven out of ten ranking (7 out of 10), and/or a middle level tier. If a supplier does not provide services on time they may be assigned a twenty percent (20%) rating, a two out of ten ranking (2 out of 10), and/or a lower level tier. The rating may then be associated with the supplier line item within the integrated and/or cleansed dataset. Based on the ratings, the system may analyze the data and determine a safety profile for each individual supplier that indicates how safe it is to conduct business with a particular supplier based on the historical data and ratings associated with the suppliers. The line of business may then determine whether or not to continue conducting business with a particular supplier based on their rating, safety profile, and/or trends detected within the rating. In one embodiment, suppliers that have been determined to not be safe to conduct business with may be highlighted or color coded within the dataset to provide a visual indicator to use caution when conducting business with the supplier. In such an embodiment, the integrated supplier tool may be configured to present one or more surveys for providing comments and/or rating suppliers which the business entity conducts business. After receiving input from the users related to the suppliers the results of the survey may be uploaded to the databases and associated with the cleansed data.

At step 130, after integrating the data from the contract database and the electronic invoicing database, the system may receive an indication to select at least one option within the supplier information tool, and at step 140, in response to receiving the indication to select the at least one option, the system may present on the user interface data related to at least one of the contract database or the electronic invoicing database.

In one embodiment, the at least one option comprises an option to provide detailed supplier research 202 such that in response to receiving an indication to select the at least one option, the system may present a detailed supplier research interface 300 within the integrated supplier information tool. As illustrated in FIG. 3, the detailed supplier research interface 300 may comprise one or more options for presenting detailed supplier research within the integrated supplier information tool. The options may include, but not be limited to, an option for searching a parent supplier name 302, an option for presenting a cleansed dataset associated with the contract database 304, an option for presenting a cleansed dataset associated with the electronic invoicing database 306, an option for resetting the information presented within the detailed supper research interface 308, an option for navigating to the home page of the supplier information tool 310, and an option to return to the home page 316. The detailed supplier research interface may further comprise a drop down menu 312. It should be noted, that as different application may be integrated within the platform, additional options to for presenting a cleansed datasets associated with the newly integrated applications.

The system may be further configured to receive an indication to select at least one option within the detailed supplier research interface 300. In one embodiment, the system may receive an indication that the option for searching a parent supplier name 302 has been selected by the user. As shown in FIG. 4, the user may first access the drop down menu 312, where the drop down menu 312 may be populated with one or more parent supplier names. In one embodiment, the parent supplier names within the drop down menu 312 may be populated based on the parent supplier names list created by the system. As such, the parent supplier names within the drop down menu 312 may reflect the various parent supplier names within the extracted and cleansed data from the contract database and the electronic invoicing database. In addition to selecting a parent supplier name by navigating the drop down menu 312, the user may type in a user input which specifies the parent supplier name. In some embodiment, the system may automatically detect the parent supplier name based on the user input as the user is typing. As illustrated in FIG. 5, after selecting a parent supplier name within the drop down menu 312, the user may select the option to search the integrated data for the selected parent supplier name 302. In response to receiving the indication to search the integrated data for the selected parent supplier name, the system may query the integrated data and present one or more parameters associated with the integrated data on a table 314 within the detailed supplier research interface 300. In some embodiments, in response to selecting the option to search the selected supplier name, the system may present a message on the user interface which indicates the "supplier results have been updated", a user may then select "OK" to clear the user message, and a secondary message may be presented which reminds the user to "please remember to reset the before a new supplier is chosen". As illustrated in FIG. 5, the parameter of the table 314 may include, but not be limited to, the supplier parent name, the supplier child and/or subsidiary name, the supplier DUNS number, the data source, the match type, an electronic invoicing enabled indicator which indicates whether or not the supplier is eligible for electronic invoicing, an vendor number, and a network ID. The types of parameters presented within the table 314 may be defined by an administrator such that the table 314 may be altered to remove and/or add parameters based on the current needs of the business entity. For example, the user may select to search "Parent A" as the parent supplier name such that data related to the parent supplier, and more specifically data related to three subsidiaries of the parent supplier "Parent A Credit Services", "Parent A PLC", and "Parent A" are presented within the data. In one embodiment, as illustrated in FIG. 5, if the supplier is not eligible for electronic invoicing the electronic (e.g. the electronic invoicing enabled indicator is marked as no), the vendor number and network identification number may not be provided. In response to receiving an indication that the user has selected the option for resetting the information presented within the detailed suppler research interface 308, the information within the table 314 may be cleared such that the user may select a new parent supplier name and populated the table 314 with new information.

In one embodiment, the system may receive an indication that the option for presenting a cleansed dataset associated with the contract database 304 has been selected by the user. As illustrated in FIG. 6, in response to receiving the indication to present a cleansed dataset associated with the contract database, the system may query the integrated data and present an contract data interface 600 that comprises a visual display of the cleansed contract dataset 602. The contract data interface 600 may further comprise an option 604 to return to the detailed supplier research interface. In one embodiment, presenting a contract data interface 600 that comprises a visual display of the cleansed contract dataset may further comprise presenting a spreadsheet that includes the cleansed contract dataset such that the user may download and or copy the data for further analysis and/or report generation.

The contract data interface 600 may display a plurality of parameters within the cleansed contract dataset including but not limited to the supplier parent name, the supplier child or subsidiary name, the supplier DUNS number, the data source, match type, the contract identification number, the contract status, the amendment type, the language exception escalation, the approved channels, the category, the owner, the subcategory, the commodity, the current published date, the effective date, the expiration date, an indication as to whether the supplier has agreed to conduct purchase order and/or invoice transactions using the platform, the hierarchy type, the email address of the line of business contact, the line of business hierarchy, the owner email address, the sum of the annual contract value, the sum of the total contract value, and the like.

In one embodiment, the system may receive an indication that the option for presenting a cleansed dataset associated with the electronic invoicing database 306 has been selected by the user. As illustrated in FIG. 7, in response to receiving the indication to present a cleansed dataset associated with the electronic invoicing database, the system may query the integrated data and present an electronic invoicing data interface 700 that comprises a visual display of the cleansed electronic invoice dataset 702. The electronic invoicing data interface 700 may further comprise an option 704 to return to the detailed supplier research interface. In one embodiment, presenting an electronic invoicing data interface 700 that comprises a visual display of the cleansed electronic invoicing dataset may further comprise presenting a spreadsheet that includes the cleansed electronic invoicing dataset such that the user may download and or copy the data for further analysis and/or report generation.

The electronic invoicing data interface 700 may display a plurality of parameters within the cleansed electronic invoicing dataset including but not limited to the supplier parent name, the supplier child or subsidiary name, the supplier DUNS number, the data source, match type, the contract identification number, the contact email address, the contract type, the contract effective date, the contract expiration date, the payment terms, payment terms description, reference contract identification, the related contract identification, the release type, the status type, the sum of the amount invoiced, the sum of the amount left, a count, the sum of the amount reconciled, the sum of the duration in month, the sum of the maximum commitment, and the like.

In one embodiment, the at least one option comprises an option for presenting a quick learning guide associated with the integrated supplier information tool 204 such that in response to receiving an indication to select the at least one option, the system may present a learning guide interface 800 within the integrated supplier information tool. As illustrated in FIG. 8, learning guide interface 800 may comprise a screen shot 802 of the various pages available for selection within the integrated supplier information tool, and a description 804 corresponding to each individual screenshot.

In one embodiment, the at least one option comprises an option for presenting a glossary associated with the integrated supplier information tool 206 such that in response to receiving an indication to select the at least one option, the system may present a glossary interface 900 within the integrated supplier information tool. As illustrated in FIG. 9, the glossary interface 900 may comprise a table 902 of keywords and definitions used within the integrated supplier information tool. The keywords and or terms within the glossary may be removed and/or added by an administrator as the needs of the business entity may alter. For example, the integrated supplier information tool may be configured to integrate an additional application such that the keyword table is subsequently amended to include information related to keywords used within the newly integrated application.

In one embodiment, the at least one option comprises an option to access integrated supplier information tool as an administrator 208 such that in response to receiving an indication to select the at least one option, the system may present a login interface within the integrated supplier information tool. As previously discussed, the login interface may be configured to prompt the user to provide login credentials within the integrated supplier information tool, for accessing the tool with administrated rights. As such, the integrated supplier tool may be configured to provide general user access functionality, and administrative right functionality. In one embodiment, the administrator may have access to connect to a website to receive data, manually input data, and or modify the data for the purposes of cleansing the data.

In one embodiment, the at least one option comprises an option to provide feedback related to integrated supplier information tool such that in response to receiving an indication to select the at least one option, the system may present a feedback interface within the integrated supplier information tool. In one embodiment, in response to selecting the feedback option, an interface for sending an email to the administrator may be provided such that a user can provide specifications for changes that are needed within the system. In another embodiment, a form or log may be provided such that the user can select feedback option, type the specification of the needed changes within the system and select save such that the log is saved and sent or viewed by an administrator of the system.

Network Environment for an Integrated Supplier Information Tool

Referring to FIG. 10, a network environment is illustrated in accordance with embodiments of the present invention. As illustrated in FIG. 10, the contract database server 1002 is operatively coupled via a network 1001 to the user computing device 1004 and/or an electronic invoicing database server 1006. In this configuration, the contract database server 1002 may send information to and receive information from the user computing device 1004 and/or the electronic invoicing database server 1006. Additionally, the user computing device 1004 may send and receive information directly from the electronic invoicing database server 1006. The contract database server 502 may be or include one or more network base stations or other network components. FIG. 10 illustrates only one example of an embodiment of a network environment 1000, and it will be appreciated that in other embodiments one or more of the systems, devices, or servers may be combined into a single system, device, or server, or be made up of multiple systems, devices, or server.

The network 1001 may be a global area network (GAN), such as the Internet, a wide area network (WAN), a local area network (LAN), a telecommunication network or any other type of network or combination of networks. The network 1001 may provide for wire line, wireless, or a combination wire line and wireless communication between devices on the network 1001.

As illustrated in FIG. 10, the contract database server 1002 generally comprises a communication device 1050, a processing device 1052, and a memory device 1054. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combination of the foregoing. Control and signal processing functions of the system are allocated between these processing devices according to their respective capabilities. The processing device may include functionality to operate one or more software programs based on computer readable instructions thereof, which may be stored in a memory device.

The processing device 1052 is operatively coupled to the communication device 1050 to communicate with the network 1001 and other devices on the network 1001. As such, the communication device 1050 generally comprises a modem, server, or other device for communicating with other devices on the network 1001.

As further illustrated in FIG. 10, the contract database server 1002 comprises computer readable instructions 1058 of an application 1060. In some embodiments, the memory device, 1054 includes data storage 1056 for storing data related to and/or used by the application 1060. The application 1060 may perform one or more of the steps and/or sub-steps discussed herein and/or one or more steps not discussed herein. For example, in some embodiments, the application 1060 may provide data to the integrated supplier information tool.

As illustrated in FIG. 10, the user computing device 1004 generally comprises a communication device 1030, a processing device 1032, and a memory device 1034. The processing device 1032 is operatively coupled to the communication device 1030 and the memory device 1034. In some embodiments, the processing device 1032 may send or receive data from the user computing device 1004, to the contract database server 1002 via the communication device 1030 over a network 1001. As such, the communication device 1030 generally comprises a modem, server, or other device for communicating with other devices on the network 1001.

As further illustrated in FIG. 10, the user computing device 1004 comprises computer readable instructions 1038 stored in the memory device 1034, which in one embodiment includes the computer-readable instructions 1038 of an application 1040. In the embodiment illustrated in FIG. 10, the application 1040 allows the user computing device 1004 to be linked to the contract database server 1002 to communicate, via a network 1001. The application 1040 may also allow the user computing device 1004 to connect directly (i.e. locally or device to device) with the electronic invoicing database server 1006 for sending and receiving information. The application 1040 may perform one or more of the steps and/or sub-steps discussed herein and/or one or more steps not discussed herein. For example, in some embodiments, the application 1040 may send information for generating an extracted dataset.

As illustrated in FIG. 10, the electronic invoicing database server 1006 may include a communication device 1010, a processing device 1012, and a memory device 1014. The processing device 1012 is operatively coupled to the communication device 1010 and the memory device 1014. In some embodiments, the processing device 1012 may send or receive data from the user computing device 1004 and/or the contract database server 1002 via the communication device 1010. Such communication may be performed either over a direct connection and/or over a network 1001. As such, the communication device 1010 generally comprises a modem, server, or other device for communication with other devices on the network 1001.

As further illustrated in FIG. 10, the electronic invoicing database server 1006 comprises computer-readable instructions 1018 of an application 1020. In the embodiment illustrated in FIG. 4, the application 1020 allows the database 1006 to be linked to the contract database server 1002 to communicate, via a network 1001. The application 1020 may also allow the user computing device 1004 to connect directly (i.e., locally or device to device) with the electronic invoicing database server 1006 or indirectly through the network 1001. The application 1020 may perform one or more of the steps and/or sub-steps discussed herein and/or one or more steps not discussed herein.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus for use in integrating supplier information, whereby the apparatus presents integrated supplier information to a user, the apparatus comprising:
   an electronic storage device;
   a computing processor; and
   a module stored in the electronic storage device, said module comprising instruction code executable by one or more computing processors, and configured to cause the one or more computing processors to:
   provide a user interface associated with an integrated supplier information tool, whereby the integrated supplier information tool is associated with a contract database and an electronic invoicing database, and wherein the user interface enables a user to select one or more options for presenting information associated with the contract database and the electronic invoicing database, wherein the contract database is stored on a contract remote database server, and the electronic invoicing database is stored on an electronic invoicing remote database server, wherein the contract database and the electronic invoicing database are independent of one another such that there is no point of comparison between the contract database and the electronic invoicing database;
   implement one or more server drivers, wherein the one or more server drivers are configured to permit communication with the contract remote database server and the electronic invoicing remote database server;
   extract data from the contract database and the electronic invoicing database;
   integrate data from the contract database and the electronic invoicing database, wherein the integrating the data comprises (1) creating a contract database dataset and an electronic invoicing database dataset, (2) automatically cleansing the data from the contract database and the electronic invoicing database such that at least one point of comparison exist between the contract database and the electronic invoicing database wherein automatically cleansing the data comprises (i) modifying the contract database dataset and an electronic invoicing database dataset to include the at least one point of comparison and (ii) deleting one or more unneeded parameters within the data from the contract database and the electronic invoicing database, wherein the one or more unneeded parameters include at least one legacy contract published for informational purposes and not required for electronic invoicing, and (3) analyzing the data from the contract database and the electronic invoicing database to generate one or more reports associated with the contract database and the electronic invoicing database;

receive an indication to select at least one option within the supplier information tool; and in response to receiving the indication to select the at least one option, present on the user interface data related to the contract database or the electronic invoicing database.

2. The apparatus of claim 1, wherein the contract database dataset and the electronic invoicing database dataset comprise a plurality of line items, and wherein cleansing the data from the contract database and the electronic invoicing database comprises the module being further configured to cause one or more computing processors to:

create the at least one point of comparison; and associate the at least one point of comparison with the plurality of line items within the contract database dataset and the electronic invoicing database dataset.

3. The apparatus of claim 2, wherein the at least one point of comparison is defined by a parent supplier name, wherein the parent supplier name is associated with a unique identification number, and wherein associating the at least one point of comparison with the plurality of line items comprises the module being further configured to cause one or more computing processor to:

for each individual line item, determine whether or not a first text string corresponding to the parent supplier name matches a text string corresponding to a supplier name parameter of the contract database dataset and the electronic invoicing database dataset; and for each individual line item, determine whether or not a second text string corresponding to the unique identification number matches a text string corresponding to a unique identification number parameter of the contract database dataset and the electronic invoicing database dataset.

4. The apparatus of claim 2, wherein associating the at least one point of comparison with the plurality of line items comprises the module being further configured to cause one or more computing processor to iteratively match each individual line item with the at least one point of comparison until each individual line item of the contract database dataset and the electronic invoicing database dataset until every field associated with the point of comparison is not null.

5. The apparatus of claim 3, wherein associating the at least one point of comparison with the plurality of line items comprises the module being further configured to cause one or more computing processor to determine a match type for each individual line item, wherein the module is configured to determine that an individual line item is an exact match in response to determining that the first text string corresponding to the parent supplier name matches the text string corresponding to a supplier name parameter of the contract database dataset and the electronic invoicing database dataset and the second text string corresponding to the unique identification number matches the text string corresponding to the unique identification number parameter of the contract database dataset and the electronic invoicing database dataset, and wherein the module is configured to determine that an individual line item is a nearest match in response to determining that the first text string corresponding to the parent supplier name matches the text string corresponding to a supplier name parameter of the contract database dataset and the electronic invoicing database dataset and the second text string corresponding to the unique identification number does not match the text string corresponding to the unique identification number parameter of the contract database dataset and the electronic invoicing database dataset.

6. The apparatus of claim 5, wherein determining a match type for each individual line item further comprises the module being further configured to cause one or more computing processors to color code an individual line item based on the determined match type, wherein the individual line item is designated with a first color in response to determining the individual line item is an exact match, and wherein the individual line item is designated with a second color in response to determining the individual line item is a nearest match.

7. The apparatus of claim 1, wherein the contract database comprises data related to a plurality of contracts associated with one or more suppliers, and wherein the module is further configured to cause one or more computing processors to provide a survey for receiving ratings related to the one or more suppliers.

8. The apparatus of claim 7, wherein the module is further configured to cause one or more computing processors to determine a safety profile for each individual supplier based on the ratings related to the one or more suppliers, and wherein the safety profile indicates a level of safety for conducting business with the one or more suppliers.

9. The apparatus of claim 8, wherein the contract database dataset and the electronic invoicing database dataset comprise a plurality of line items, and wherein the safety profile is associated with each individual line item, and wherein determining the safety profile for each individual supplier comprises the module being further configured to cause one or more computing processors to color code an individual line item associated with each individual supplier based on the ratings related to the one or more suppliers.

10. The apparatus of claim 1, wherein the at least one option comprises an option to provide feedback related to integrated supplier information tool such that in response to receiving an indication to select the at least one option, the module is further configured to cause one or more computing processors to present a feedback interface within the integrated supplier information tool.

11. The apparatus of claim 2, wherein cleansing the data comprises modifying the contract database dataset and an electronic invoicing database dataset to include, for each line item, a level of accuracy with respect to the at least one point of comparison.

12. A computer implemented method for integrating supplier information, comprising:

providing a user interface associated with an integrated supplier information tool, whereby the integrated supplier information tool is associated with a contract database and an electronic invoicing database, and wherein the user interface enables a user to select one or more options for presenting information associated with the contract database and the electronic invoicing database, wherein the contract database is stored on a contract remote database server, and the electronic invoicing database is stored on an electronic invoicing remote database server, wherein the contract database and the electronic invoicing database are independent of one another such that there is no point of comparison between the contract database and the electronic invoicing database;

implementing one or more server drivers, wherein the one or more server drivers are configured to permit communication with the contract remote database server and the electronic invoicing remote database server;

extracting data from the contract database and the electronic invoicing database;

integrating the data from the contract database and the electronic invoicing database, wherein the integrating the data comprises (1) creating a contract database dataset and an electronic invoicing database dataset, (2) automatically cleansing the data from the contract database and the electronic invoicing database such that at least one point of comparison exist between the contract database and the electronic invoicing database, wherein automatically cleansing the data comprises (i) modifying the contract database dataset and an electronic invoicing database dataset to include the at least one point of comparison and (ii) deleting one or more unneeded parameters within the data from the contract database and the electronic invoicing database, wherein the one or more unneeded parameters include at least one legacy contract published for informational purposes and not required for electronic invoicing, and (3) analyzing the data from the contract database and the electronic invoicing database to generate one or more reports associated with the contract database and the electronic invoicing database;

receiving an indication to select at least one option within the supplier information tool; and in response to receiving the indication to select the at least one option, presenting on the user interface data related to the contract database or the electronic invoicing database.

13. The method of claim 12, wherein the contract database dataset and the electronic invoicing database dataset comprise a plurality of line items, and wherein cleansing the data from the contract database and the electronic invoicing database comprises:

creating the at least one point of comparison; and associating the at least one point of comparison with the plurality of line items within the contract database dataset and the electronic invoicing database dataset.

14. The method of claim 13, wherein the at least one point of comparison is defined by a parent supplier name, wherein the parent supplier name is associated with a unique identification number, and wherein associating the at least one point of comparison with the plurality of line items comprises:

for each individual line item, determining whether or not a first text string corresponding to the parent supplier name matches a text string corresponding to a supplier name parameter of the contract database dataset and the electronic invoicing database dataset; and for each individual line item, determining whether or not a second text string corresponding to the unique identification number matches a text string corresponding to a unique identification number parameter of the contract database dataset and the electronic invoicing database dataset.

15. The method of claim 13, wherein associating the at least one point of comparison with the plurality of line items comprises iteratively matching each individual line item with the at least one point of comparison until each individual line item of the contract database dataset and the electronic invoicing database dataset until every field associated with the point of comparison is not null.

16. The method of claim 14, wherein associating the at least one point of comparison with the plurality of line items comprises determining a match type for each individual line item by:

determining that an individual line item is an exact match in response to determining that the first text string corresponding to the parent supplier name matches the text string corresponding to a supplier name parameter of the contract database dataset and the electronic invoicing database dataset and the second text string corresponding to the unique identification number matches the text string corresponding to the unique identification number parameter of the contract database dataset and the electronic invoicing database dataset, and determining that an individual line item is a nearest match in response to determining that the first text string corresponding to the parent supplier name matches the text string corresponding to a supplier name parameter of the contract database dataset and the electronic invoicing database dataset and the second text string corresponding to the unique identification number does not match the text string corresponding to the unique identification number parameter of the contract database dataset and the electronic invoicing database dataset.

17. The method of claim 16, wherein determining a match type for each individual line item further comprises color coding an individual line item based on the determined match type, wherein the individual line item is designated with a first color in response to determining the individual line item is an exact match, and wherein the individual line item is designated with a second color in response to determining the individual line item is a nearest match.

18. A computer program product for use in integrating supplier information, the computer program product comprising a non-transitory computer-readable medium comprising a set of codes for causing a computer to:

provide a user interface associated with an integrated supplier information tool, whereby the integrated supplier information tool is associated with a contract database and an electronic invoicing database, and wherein the user interface enables a user to select one or more options for presenting information associated with the contract database and the electronic invoicing database, wherein the contract database is stored on a contract remote database server, and the electronic invoicing database is stored on an electronic invoicing remote database server, wherein the contract database and the electronic invoicing database are independent of one another such that there is no point of comparison between the contract database and the electronic invoicing database;

implement one or more server drivers, wherein the one or more server drivers are configured to permit communication with the contract remote database server and the electronic invoicing remote database server;

extract data from the contract database and the electronic invoicing database;

integrate the data from the contract database and the electronic invoicing database, wherein the integrating the data comprises (1) creating a contract database dataset and an electronic invoicing database dataset, (2) automatically cleansing the data from the contract database and the electronic invoicing database such that at least one point of comparison exist between the contract database and the electronic invoicing database, wherein automatically cleansing the data comprises (i) modifying the contract database dataset and an electronic invoicing database dataset to include the at least one point of comparison and (ii) deleting one or more unneeded parameters within the data from the contract database and the electronic invoicing database, wherein the one or more unneeded parameters include at least one legacy contract published for informational purposes and not required for electronic invoicing and (3) analyzing the data from the contract database and the electronic invoicing database to generate one or more reports associated with the contract database and the electronic invoicing database;

receive an indication to select at least one option within the supplier information tool; and in response to receiving the indication to select the at least one option, present on the user interface data related to the contract database or the electronic invoicing database.

* * * * *